United States Patent [19]

Goodman et al.

[11] Patent Number: 5,087,525

[45] Date of Patent: * Feb. 11, 1992

[54] COATED GLASS ARTICLES

[75] Inventors: Ronald D. Goodman, Toledo; Peter J. Tausch, Perrysburg, both of Ohio

[73] Assignee: Libbey-Owens-Ford Co., Toledo, Ohio

[*] Notice: The portion of the term of this patent subsequent to Jul. 11, 2006 has been disclaimed.

[21] Appl. No.: 518,217

[22] Filed: May 3, 1990

Related U.S. Application Data

[63] Continuation-in-part of Ser. No. 423,196, Oct. 18, 1989, abandoned, which is a continuation-in-part of Ser. No. 313,396, Feb. 21, 1989, abandoned.

[51] Int. Cl.$^5$ .............................................. B32B 17/06
[52] U.S. Cl. ................... 428/428; 428/216; 428/334; 428/426; 428/446; 428/698; 428/699; 428/701; 428/704; 428/913
[58] Field of Search ............... 428/432, 426, 212, 213, 428/216, 332, 334, 446, 447, 448, 689, 698, 699, 701, 702, 704, 913

[56] References Cited

U.S. PATENT DOCUMENTS

| 3,885,855 | 5/1975 | Gross | 428/427 |
|---|---|---|---|
| 4,100,330 | 7/1978 | Donley | 428/446 |
| 4,188,144 | 2/1980 | Landau | 428/428 |
| 4,341,841 | 7/1982 | Ohno et al. | 428/432 |
| 4,358,507 | 11/1982 | Senaha et al. | 428/432 |
| 4,448,855 | 5/1984 | Senaha et al. | 428/432 |
| 4,450,201 | 5/1984 | Brill et al. | 428/432 |
| 4,534,841 | 8/1985 | Hartig et al. | 428/426 |
| 4,847,157 | 7/1989 | Goodman et al. | 428/426 |

FOREIGN PATENT DOCUMENTS

| 0054642 | 3/1984 | Japan . |
|---|---|---|
| 0042253 | 3/1985 | Japan . |
| 0141647 | 7/1985 | Japan . |

Primary Examiner—Ellis P. Robinson
Assistant Examiner—Archene A. Turner
Attorney, Agent, or Firm—Marshall & Melhorn

[57] ABSTRACT

Coated class articles, particularly useful as vehicle or architectural glazings, are prepared by a chemical vapor deposition process in which glass is coated with a first layer of titanium nitride, a second layer of a silicon complex, and optionally, a third layer of a metal oxide.

20 Claims, 1 Drawing Sheet

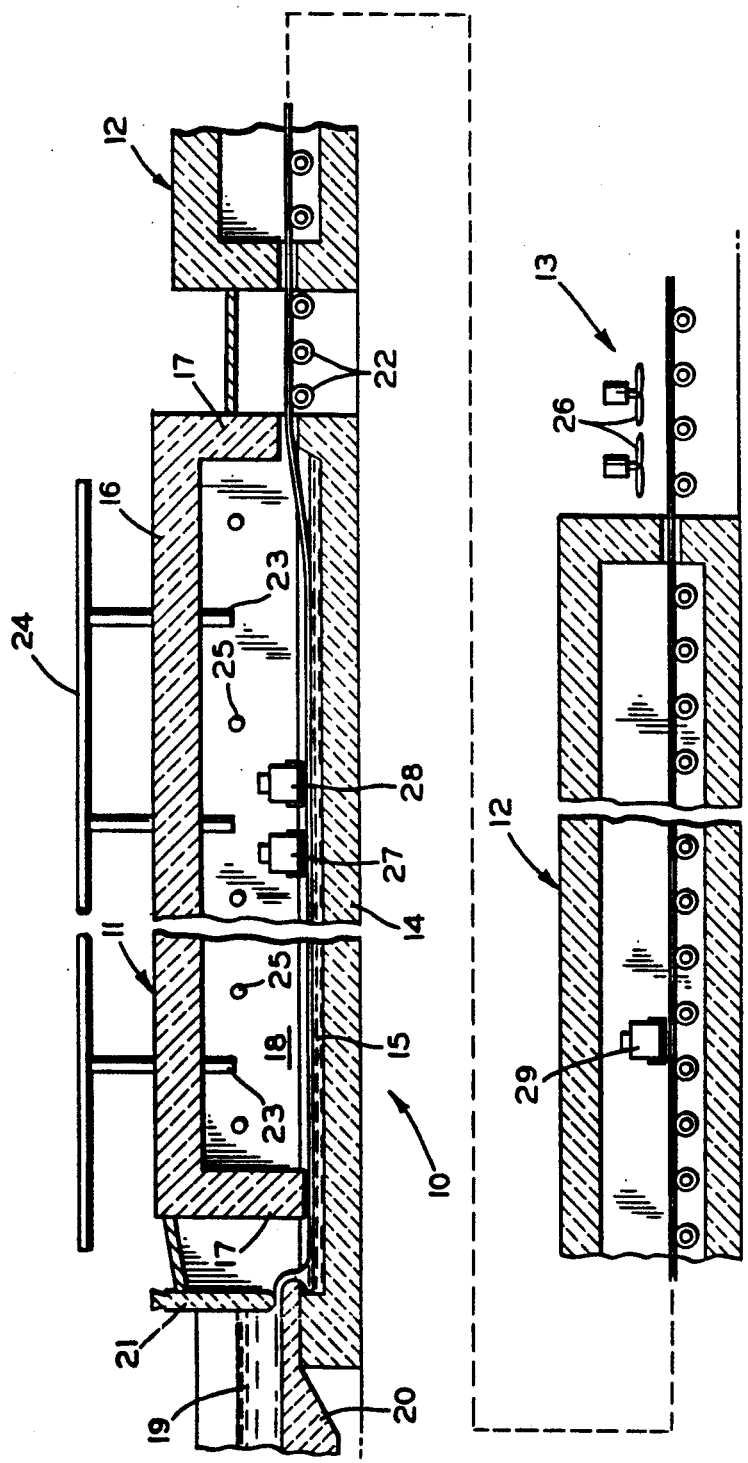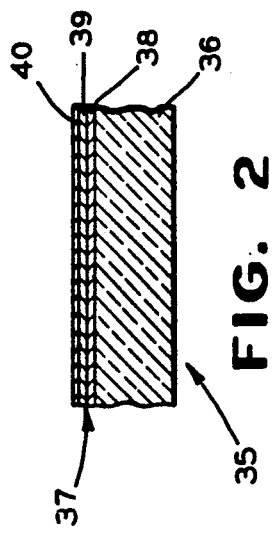

COATED GLASS ARTICLES

RELATED APPLICATIONS

This application is a Continuation-In-Part of U.S. application Ser. No. 07/423,196, filed Oct. 18, 1989, now abandoned, which in turn is a Continuation-In-Part of application Ser. No. 07/313,396, filed Feb. 21, 1989, now abandoned.

FIELD OF THE INVENTION

This invention relates to a process for coating glass articles, and the coated glass articles produced thereby. More particularly it relates to a continuous chemical vapor deposition (CVD) process for producing coated, heat reducing privacy glass for vehicles or architectural windows and to the coated glass articles so produced.

BACKGROUND OF THE INVENTION

The process of coating glass with a layer of silicon or a silicon complex, by continuous chemical treatment of a hot glass substrate with a non-oxidizing gas containing a monosilane, is disclosed in U.S. Pat. No 4,019,877 to Kirkbride at al. The use of ethylene in the non-oxidizing gas of the Kirkbride et al. process is disclosed in U.S. Pat. No. 4,188,444 to Landau, which additionally discloses that the inclusion of ethylene improves the resistance of the silicon complex layer to attack by alkali compounds.

U.S. Pat. No. 4,535,000 to Gordon discloses that mixture of ammonia and titanium tetrachloride are useful for coating glass substrates by chemical vapor deposition to produce coatings of titanium nitride.

Finally U.S. Pat. No. 4,100,330 to Donley discloses a process for coating a glass substrate with a first layer of silicon and a second layer of a metal oxide.

Typically, coated glass articles are produced by continuously coating a glass substrate while it is being manufactured in a process known in the art as the "Float Glass Process". This process involves casting glass onto a molten tin bath which is suitably enclosed, thereafter transferring the glass, after it has sufficiently cooled, to lift-out rolls which are aligned with the bath, and finally cooling the glass as it advances across the rolls, initially through a lehr and thereafter while exposed to the ambient atmosphere. A non-oxidizing atmosphere is maintained in the float portion of the process, while the glass is in contact with the molten tin bath, to prevent oxidation. An oxidizing atmosphere is maintained in the lehr.

It would be advantageous to deposit the desired coating layers onto the surface of a glass substrate while the glass is being formed in the Float Glass Process.

SUMMARY OF THE INVENTION

The present invention is directed toward novel coated glass articles, useful for producing coated, heat reducing privacy glass for vehicles or architectural windows, comprising: a glass substrate; a coating of titanium nitride adhered to the glass substrate; a coating of a silicon complex adhered to the titanium nitride coating; and optionally, a coating of a metal oxide adhered to the silicon complex coating.

The attributes for a privacy glass result from a balance between the wish for privacy and the wish for easy viewing of external objects on the part of the occupant. Privacy requires a glass that masks the inside from external observers. This is accomplished by having an enhanced outside visible reflection and/or a reduced transmission. For the occupant inside the vehicle looking outside at his surroundings it is desirable to have a low internal reflection and a high enough visible transmission so that outside luminous objects can be seen. Since the optimum transmission level is different in these two cases, some transmission level must be obtained which balances a suitable masking ratio from the outside with a suitable observation ratio from inside the vehicle.

Accordant with the present invention, it has surprisingly been discovered that coated, heat-reducing privacy glass for vehicles or architectural windows may be produced by a novel process, comprising the steps of: providing a glass substrate; depositing onto the glass substrate a coating of titanium nitride, by reacting a mixture of a titanium tetrahalide such as for example titanium tetrachloride and a reducing agent such as for example ammonia, at or near a surface of the glass substrate; depositing onto the titanium nitride coating a coating of a silicon complex, by reacting an oxidizing or non-oxidizing gas mixture containing a silane such as for example silicon tetrahydride and preferably an olefin such as for example ethylene, at or near the surface of the titanium nitride coating; and optionally, depositing onto the silicon complex coating a coating of a metal oxide. The steps of depositing the titanium nitride, silicon complex, and optional metal oxide coatings conveniently may be carried out during the manufacture of the glass article in the process known in the art as the Float Glass Process.

The coated glass articles of the present invention exhibit low emittance properties, thereby resulting in improved insulating capabilities over uncoated glass articles having otherwise identical compositions and thicknesses. The coated glass articles of the present invention additionally are characterized by low visible reflection from both the glass and coated surfaces, and low shading coefficients, making them particularly suitable for privacy glass for vehicles or architectural windows.

BRIEF DESCRIPTION OF THE DRAWINGS

The novel features considered characteristic of the invention are set forth with particularity in the appended claims. The invention itself, however, both as to structure and method of manufacture, together with additional objects and advantages thereof, will best be understood from the following description of specific embodiments, when read in connection with the accompanying drawings, in which:

FIG. 1 is a somewhat schematic view, in vertical section, of an apparatus for practicing the float glass process, which includes three gas distributors suitably positioned to enable the practicing of the process of the present invention; and FIG. 2 is a broken sectional view of a coated glass article, according to the present invention.

DETAILED DESCRIPTION OF THE DRAWINGS

Referring now more particularly to the drawings, there is illustrated in FIG. 1, an apparatus, indicated generally at 10, useful for practicing the process of the present invention, comprising a float section 11, a lehr 12, and a cooling section 13. The float section 11 has a bottom 14 which contains a molten tin bath 15, a roof 16, sidewalls (not shown), and end walls 17, which together form a seal such that there is provided an enclosed zone 18, wherein a non-oxidizing atmosphere is maintained, as hereinafter described in greater detail, to prevent oxidation of the tin bath 15. During operation of the apparatus 10, molten glass 19 is cast onto a hearth 20, and flows therefrom under a metering wall 21, then downwardly onto the surface of the tin bath 15 from which it is removed by lift-out rolls 22 and conveyed through the lehr 12 and thereafter through the cooling section 13.

A non-oxidizing atmosphere is maintained in the float section 11 by introducing a suitable gas, such as for example one composed of 99 percent by volume nitrogen and 1 percent by volume hydrogen, into the zone 18, through conduits 23 which are operably connected to a manifold 24. The non-oxidizing gas is introduced into the zone 18 from the conduits 23 at a rate sufficient to compensate for losses of the gas (some of the non-oxidizing atmosphere leaves the zone 18 by flowing under the end walls 17), and to maintain a slight positive pressure, conveniently about 0.001 to about 0.01 atmosphere above ambient pressure. The tin bath 15 and the enclosed zone 18 are heated by radiant heat directed downwardly from heaters 25. The atmosphere in the lehr 12 is typically air, and the cooling section 13 is not enclosed. Ambient air is blown onto the glass by fans 26.

The apparatus 10 also includes gas distributors 27 and 28 in the float zone 11, and a gas distributor 29 in the lehr. Alternatively gas distributor 29 could be placed in the float zone 11 (not shown).

FIG. 2 illustrates the coated glass article of the present invention, indicated generally at 35, comprising a glass substrate 36, and a multilayered coating 37 adhered to one surface thereof. The multilayered coating comprises a coating of titanium nitride 38, a coating of a silicon complex 39, and optionally, a coating of a metal oxide or an oxide of silicon 40.

DETAILED DESCRIPTION OF THE PREFERRED EMBODIMENT

The glass substrates suitable for use in preparing the coated glass articles according to the present invention may include any of the conventional glass compositions known in the art as useful for the preparation of vehicle or architectural glazings. The various chemical compositions which produce different colors of glass generally do not structurally nor chemically affect the chemical compositions of the multilayered coatings deposited thereon, but do alter the performance parameters of the finished coated glass articles, due to the differing solar absorption characteristics for different glass compositions. Glasses of various colors, generally prepared by altering their chemical compositions to produce such as for example clear blue blue-green, green, grey, and bronze glasses, absorb radiation differently in the visible and infrared regions of the solar spectrum, which additionally modifies the appearance of the coated glass articles. Differing glass chemical compositions, which otherwise result in identical colors, likewise result in different absorption, performance and appearance characteristics. A preferred glass substrate is commonly known in the art as a neutral grey glass.

The titanium nitride coating of the present invention may be suitably prepared by any of the conventional methods generally known in the art, such as for example by the chemical vapor deposition (CVD) method, wherein a mixture of for example a titanium tetrahalide and a reducing agent is reacted at or near the surface of the article upon which the titanium nitride coating is to be deposited. A preferred titanium tetrahalide is titanium tetrachloride. A preferred reducing agent is anhydrous ammonia. The aforementioned method for preparing a titanium nitride coating is more fully set forth in U.S. Pat. No. 4,545,000, which is incorporated herein in its entirety by reference thereto.

The silicon complex coating useful for the present invention may be prepared by conventional processes, such as for example by the chemical vapor deposition method, wherein an oxidizing or non-oxidizing gas mixture containing a silane and preferably an olefin is reacted at or near the surface of the article upon which the silicon complex layer is to be deposited. The silicon complex composition is conveniently expressed as $SiC_xO_y$, wherein x may vary from just more than 0 to about 1, and y may vary from just more than 0 to about 2. Examples of silanes useful for preparing the silicon complex coating include, but are not limited to, silicon tetrahydride, monochlorosilane, dichlorosilane, tetrahalosilanes such as for example tetrachlorosilane, alkoxysilanes, and di-, tri- and higher-silanes. A preferred silane, considering cost, availability and low environmental impact is silicon tetrahydride whose reaction by products include hydrogen. Suitable olefins for use according to the present invention include ethylene, propylene and the like. A preferred olefin is ethylene. An oxidizer may be included in the CVD reactant mixture, to increase the thickness of the silicon complex coating which reduces the film side reflectance of the ultimately produced coated glass article. Suitable oxidizers include, but are not limited to, carbon dioxide, carbon monoxide, oxygen, air, water vapor, and mixtures thereof. A preferred oxidizer is carbon dioxide. Specific methods for preparing silicon complex coatings are disclosed in U.S. Pat. No. 4,188,444, which is hereby incorporated in its entirety by reference thereto.

A metal oxide or a silicon oxide coating may optionally be deposited as the final coating, to impart durability to the coated glass article. Useful metal oxides are tin oxide, titanium oxide, aluminum oxide, and the like. The metal oxide coatings suitable for use in the present invention may be prepared by conventional processes known in the art, such as for example by the decomposition of organometallic or other metallic compounds or mixtures thereof, in an oxidizing atmosphere, at or near the surface of the article upon which the metal oxide coating is to be deposited. Convenient organometallic compounds include tetramethyl tin, dimethyltin dichloride, tetrebutyl titanate, triethyl aluminum, diethlyl aluminum chloride and the like. Other metallic compounds include stannic chloride, titanium tetrachloride, etc. Suitable compounds may include for example mixtures of titanium tetrachloride, boron hydride and dimethyl aluminum chloride. A preferred organometallic compound is tetramethyl tin for depositing a coating of tin oxide. Examples of oxidizing atmospheres are water vapor, air, or air enriched with oxygen, nitrogen, another inert gas, or mixtures thereof. A preferred oxidizing atmosphere is air. A method for preparing metal oxide coatings is set forth in U.S. Pat. No. 4,100,330. which is hereby incorporated in its entirety by reference thereto.

The coated glass articles of the present invention may suitably include a glass substrate of any thickness which may practicably be manufactured by the Float Glass Process. The titanium nitride coating is about 200 to about 600 Angstroms thick; preferably about 300 to about 550 Angstroms thick. The silicon complex coating is about 75 to about 300 Angstroms thick; preferably about 75 to about 150 Angstroms thick. The optional metal oxide coating is about 100 to about 500 Angstroms thick; preferable about 150 to about 300 Angstroms thick.

The coated glass articles generally exhibit a visible light transmittance less than about 36%. Preferably, the visible light transmittance is from about 15% to about 30%. The shading coefficient, measured on both sides of the coated glass article, generally is less than about 0.50. The reflectance, when viewed from the coated side, is less than about 25%, and when viewed from the glass side, is less than about 20%. Preferably, the reflectance when viewed from the coated side, is less than about 15%. The shading coefficient and transmittance values will, of course, vary depending upon the color and thickness of the glass substrate used.

The process of the present invention may generally be described as a continuous chemical vapor deposition method for producing coated glass articles. The process entails forming a glass substrate, generally in a Float Glass Process, and continuously advancing the glass substrate, while hot, past first, second, and optionally third successive treating stations, generally defined as the locations adjacent the gas distributors, illustrated in FIG. 1. The first two treating stations are positioned in a sealed zone in which a non oxidizing atmosphere is maintained. An oxidizing atmosphere is maintained in the vicinity of the optional third treating station. The non-oxidizing atmosphere is generally a gas comprising about 99% by volume nitrogen and 1% by volume hydrogen. However, other inert gases can be substituted for the nitrogen, or the proportion of hydrogen can be increased or decreased, so long as the desired result is achieved; i.e., oxidation of the tin bath is prevented, and titanium nitride and silicon complex coatings are sequentially deposited onto the glass substrate. Where the deposition of the silicon complex coating is achieved by using a gas stream containing an oxidizer, care must be taken to avoid the escape of any of the CVD reactant from the treating station into the sealed zone. The oxidizing atmosphere in the lehr, which generally comprises water vapor, air, or air enriched with oxygen, nitrogen, an inert gas, or mixtures thereof, may instead contain other gases, so long as the desired result is achieved; i.e., the optional deposition of a metal oxide is accomplished without undue detriment to the lehr itself.

Alternatively, the optional third treating station may be positioned within the sealed zone of the bath (not shown), if an appropriate oxidizing atmosphere is provided by the gas distributor at the surface of the hot glass, and the residual oxidizing atmosphere and by products are exhausted from the sealed zone, so as to not contaminate the metal bath. It is contemplated that, when an optional metal oxide layer is to be applied to the coated glass article, a thin layer of silicon oxide may first have to be intentionally formed on the silicon or silicon complex layer, prior to the formation of the metal oxide coating in order to eliminate visual pinhole defects in the finished coated glass article.

The essential steps of the process of the present invention include firstly, providing a glass substrate, generally achieved by the process known in the art as the Float Glass Process. The glass substrate will generally have a temperature of at least 925° F. The temperature will, of course, be much higher for CVD processes carried out in the heated zone of the bath, in which temperatures are generally in the 1,200° F. range. A preferred glass is generally known in the art as a grey or neutral grey glass. A typical composition for this glass is disclosed in U.S. Pat. No. 2,938,808.

Secondly, a coating of titanium nitride is deposited onto the glass substrate, by reacting a mixture of a titanium tetrahalide and a reducing agent at or near the surface of the glass substrate. Typical concentrations of the mixed gases range from about 0.25 to about 10 mole percent titanium tetrahalide, and about 2 to about 50 mole percent reducing agent; preferably the range is about 0.5 to about 3 mole percent titanium tetrahalide, and about 3 to about 10 mole percent reducing agent. A preferred titanium tetrahalide is titanium tetrachloride, and a preferred reducing agent is anhydrous ammonia. This step is generally conducted at a glass substrate temperature of about 1,200° ±100° F.

Thirdly, a coating of a silicon complex is deposited onto the titanium nitride coating, by reacting an oxidizing or non-oxidizing gas mixture containing a silane and preferably an olefin at or near the surface of the titanium nitride coating. Typical concentrations for the silane and olefin in the oxidizing or non-oxidizing gas mixture are from about 1% to about 10% by volume silane, and from about 1% to about 20% by volume olefin. An oxidizer may be included, at a concentration up to about 25% by volume. A preferred silane is silicon tetrahydride, a preferred olefin is ethylene, and a preferred oxidizer is carbon dioxide. The use of ethylene provides distinct advantages to the production of the silicon complex coating. A small amount of ethylene changes the optical properties of the ultimate coated glass article, such that the visible light transmittance increases without significantly affecting the shading coefficient, and a more acceptable color in reflection and transmission is achieved. This step generally also is conducted at a glass substrate temperature of about 1,200° F. ±100° F.

Finally, an optional coating of a metal oxide or oxide of silicon may be deposited onto the silicon complex coating. This is accomplished, in the case of the metal oxide, by decomposing an organometallic or other metallic compound, or mixtures thereof, in an oxidizing atmosphere, at or near the surface of the silicon complex coating. A preferred organometallic compound is tetramethyl tin, which is generally mixed with air at a rate of less than 1.6% by volume prior to its delivery at the surface of the silicon coating (higher concentrations of tetramethyl tin are generally flammable). This step generally is conducted at a temperature of about 970° F. ±20° F. in the lehr, or at about 1,200° F. ±100° F. in the heated zone of the bath.

It must be noted that the process conditions are not sharply critical for the successful preparation of coated glass articles according to the present invention. The process conditions described hereinabove are generally disclosed in those terms which are conventional to the practice of this invention. Occasionally, the process conditions as described may not be applicable for each compound included within the disclosed scope. Those compounds for which this occurs will be readily recognizable by those ordinarily skilled in the art. In all such cases, either the process may be successfully performed by conventional modifications known to those of ordinary skill in the art, e.g , by increasing or decreasing temperature conditions, by varying the glass substrate advancement rate, by changing to alternative conventional chemical reagents, by routine modification of deposition reaction conditions, etc., or other process conditions which are otherwise conventional will be applicable to the practice of this invention. By the aforementioned routine process modifications, it is possible to produce coated glass articles having virtually any coating thickness, which may conventionally be produced by chemical vapor deposition methods.

By the term titanium nitride coating, as used in the present invention, is also contemplated titanium nitride having incorporated therein carbon, chlorine, and oxygen, as well as traces of other elements which may result from either the coating precursor materials or the silicon coating.

By the term silicon complex coating, as used in the present invention, is contemplated a silicon complex represented by the general formula $SiC_xO_y$, containing some amounts of carbon and oxygen, particularly in the case when the coating precursors contain an oxidizer and an olefin. In the silicon complex formula, x can vary from more than 0 to no more than about 1, and y can vary from more than 0 to no more than about 2. For example, chemical vapor deposition of a gas containing 2.4 parts ethylene to 1 part silane results in a silicon complex coating containing approximately 25% carbon and 35% oxygen, balance silicon (atomic percent). Also contemplated is silicon having a surface oxide layer, formed thereon upon lift-out of the glass substrate from the tin bath and during its travel through the oxidizing atmosphere of the lehr prior to treatment at the optional third treatment station, or alternatively formed by the application of an isolated oxidizing atmosphere to the surface of the silicon complex coating in the heated zone of the bath. This surface oxide layer, when present, has been found to inhibit the formation of pinhole defects in the coated glass articles where a subsequent coating, such as tin oxide is deposited onto the silicon or silicon complex coating.

The invention is more easily comprehended by reference to specific embodiments which are representative of the invention. It must be understood, however that the specific embodiments are provided only for the purpose of illustration, and that the invention may be practiced otherwise than as specifically illustrated without departing from its spirit and scope.

EXAMPLE 1

Heat absorbing, blue-green colored glass, containing about 14% by weight of $Na_2O$, about 73% by weight $SiO_2$, about 8.5% by weight CaO, about 0.48% by weight $Fe_2O_3$, about 0.18% by weight $Al_2O_3$, about 0.01% by weight $TiO_2$, about 4% by weight MgO and about 0.001% by weight $Co_3O_4$, is charged onto the hearth in a Float Glass Process, and caused to flow onto a tin bath, thereby forming a glass substrate 12 feet wide and about 5/32 inch thick. The glass substrate is advanced at a speed of about 32 feet per minute, and has a temperature at the hearth of approximately 2,000° F. A non-oxidizing atmosphere, comprising 99% by volume nitrogen and 1% by volume hydrogen, is maintained over the hearth at a pressure of about 1.006 atmospheres. The glass substrate is treated at a first treatment station with a gas mixture comprising 0.8% by volume titanium tetrachloride, 3.8% by volume ammonia and 95.4% by volume helium. The glass substrate, having a titanium nitride coating thereon, is next treated at treatment station two, with a gas mixture comprising 84.8% by volume nitrogen, 4.5% by volume silicon tetrahalide and 10.7% by volume ethylene. The glass substrate temperature is approximately 1,200° F. at treatment stations one and two. The glass substrate, having titanium nitride and silicon complex coatings thereon, is advanced to the discharge end of the float zone in about 44 to 67 seconds. Upon lift out from the tin bath, the glass substrate is conveyed into the lehr, to a third treatment station, and has a temperature of approximately 975° F. The glass substrate, having titanium nitride and silicon complex coatings thereon is treated, in the oxidizing (air) atmosphere of the lehr, with a gas comprising 98.6% by volume air and 1.4% by volume tetramethyl tin.

The resulting coated glass article comprises a glass substrate having adhered thereto sequential coatings of titanium nitride, about 312 ±50 Angstroms thick, silicon complex, about 134 ±50 Angstroms thick, and tin oxide, about 250 ±50 Angstroms thick. The coated glass article is yellow-green in reflection from both the glass and coated sides. The emissivity is about 0.65 to about 0.75. The shading coefficient is about 0.43 from the glass side. The visible reflectance is about 16% from the glass side, and about 7.7% from the coated side. The daylight or visible transmittance is about 36%, and the coated glass article is temperable.

The color compatibility, which results from a unique combination of layer compositions and thicknesses, is best defined by reference to the CIELAB color scale system. Thus, the CIE (Commission Internationale de l'Eclairage) established several illuminants of known spectral distributions as standards for use in color measurements. Tristimulus colorimetry is based upon the fact that any color can be reproduced by three other colors of controlled amounts. Tristimulus color scales include the X, Y, Z system which represents the ratios of the integrals of light reflected from a sample being measured to the integrals of light reflected from a perfect diffuser, when both are multiplied wavelength by wavelength by the response curve of the Standard Observer and by the Illuminant "C". The 1931 CIE Standard Observer response curves define the amount of each of three primary lights (green, amber and blue) needed to reproduce energy of each wavelength from 380 nm to 750 nm wherein the green curve is the standard luminosity curve for the human eye (x is amber, y is green and z is blue).

The L, a, b tristimulus system has gained wide acceptance in recent years. L represents the mathematical approximation of the non-linear black-white response of the eye. A perfect white has a value of one hundred and a perfect black has a value of zero. The values of "a" and "b" identify the hue and chroma or color of the sample. A plus value of "a" indicates redness and a minus value indicates greenness. A plus value for "b" indicates yellowness and a minus value indicates blueness. The 1976 CIE L*, a*, b* scale, or CIELAB scale, has the following relationship with the CIE x, y, z scale:

$L^* = 116(Y/Y_o)^{\frac{1}{3}} - 16$ $a^* = 500((X/X_o)^{\frac{1}{3}} - (Y/Y_o)^{\frac{1}{3}})$ $b^* = 200((Y/Y_o)^{\frac{1}{3}} - (Z/Z_o)^{\frac{1}{3}})$ where $X/X_o$, $Y/Y_o$ and $Z/Z_o$ are each greater than 0.01 and $X_o$, $Y_o$, $Z_o$ define the color of the nominally white object-color stimulus.

The coated glass article in Example 1 exhibits the following CIELAB parameters:

| | |
|---|---|
| Transmitted Color: | $a^* = -7.8$ |

|                      |            |
| -------------------- | ---------- |
|                      | b* = +3.8  |
| Glass Side Reflected | a* = −6.6  |
| Color:               | b* = −3.9  |

PREDICTIVE EXAMPLE 2

The procedure described in Example 1 is duplicated, excepting that grey colored glass is used for the substrate. The coating thicknesses are identical to those in Example I. The following performance parameters are determined through computer modeling, utilizing the measured values obtained from Example 1.

The coated glass article appears silver in reflection from both the glass and coated sides. The CIELAB parameters for Transmitted Color are a*=−2.5 and b*=+3.5, and for Glass Side Reflected Color are a*=−1 and b*=−3. The shading coefficient is about 0.43 from the glass side. The visible reflectance is about 10.3% from the glass side, and about 7.1% from the coated side. The visible transmittance is about 26.3%. The color in transmittance is neutral.

PREDICTIVE EXAMPLE 3

The procedure described in Example 1 is duplicated, excepting that the coating thicknesses are 550 ±50 Angstroms for titanium nitride, 125 ±50 Angstroms for the silicon complex coating and 200 ±50 Angstroms for the tin oxide coating. The following performance parameters are again computer generated, utilizing measured values from Example 1.

The coated glass article appears yellow-green in reflection from the glass side, and yellow-red in reflectance from the coated side. The CIELAB parameters for Transmitted Color are a*=−7 and b*=+4, and for Glass Side Reflected Color are a*=−10 and b*=+15. The coated side reflectance is about 3.7%, and the glass side reflectance is about 18.75%. The visible transmittance is about 27.5%, and the shading coefficient is about 0.37 from the glass side.

EXAMPLE 4

The procedure described in Example 1 is generally duplicated, excepting that about 4.5% by volume of carbon dioxide oxidizer is added to the reactant for producing the silicon complex coating, and the metal oxide coating is eliminated. The coating thicknesses are 200 ±50 Angstroms for titanium nitride and 95 ±50 Angstroms for the silicon complex, on ¼" grey glass. The CIELAB parameters for Transmitted Color are a*=−3.61 and b*=4.37, and for Glass Side Reflected Color are a*=2.25 and b*=−9.89. The visible transmittance is about 26.4%. and the shading coefficient is about 0.48 from the glass side. The coated side reflectance is about 6.2%. and the glass side reflectance is about 14.9%

EXAMPLE 5

The procedure described in Example 1 is generally duplicated, excepting that about 23% by volume of carbon dioxide oxidizer is added to the reactant for producing the silicon complex coating, and the metal oxide coating is eliminated. The coating thicknesses are 270 ±50 Angstroms for titanium nitride and 150 ±50 Angstroms for the silicon complex, on ¼" thick grey glass. The CIELAB parameters for Transmitted Color are a*=−2.35 and b*=3.71, and for Glass Side Reflected Color are a*=1.5 and b*=−10.21. The coated side reflectance is about 14.1%. and the glass side reflectance is about 6.9%. The visible transmittance is about 25.8%. The shading coefficient is about 0.48 from the glass side.

EXAMPLE 6

Heat absorbing, neutral grey glass, is charged onto the hearth in a Float Glass Process, and caused to flow onto a tin bath, thereby forming a glass substrate 12 feet wide and about 5/32 inch thick. The glass substrate is advanced at a speed of about 38 feet per minute, and has a temperature at the hearth of approximately 2,000° F. A non-oxidizing atmosphere, comprising 99% by volume nitrogen and 1% by volume hydrogen, is maintained over the hearth at a pressure of about 1.006 atmospheres. The glass substrate is treated at a first treatment station with a gas mixture comprising 0.8% by volume titanium tetrachloride, 3.8% by volume ammonia and 95.4% by volume helium. The glass substrate, having a titanium nitride coating thereon, is next treated at treatment station two, with a gas mixture comprising 86.5% by volume nitrogen, 4.5% by volume silicon tetrahalide and 9.0% by volume ethylene. The glass substrate temperature is approximately 1,250° F. at treatment stations one and two. The glass substrate, having titanium nitride and silicon complex coatings thereon, is advanced to the discharge end of the float zone in about 44 to 67 seconds. Upon lift out from the tin bath, the glass substrate is conveyed into the lehr, to a third treatment station, and has a temperature of approximately 975° F. The glass substrate, having titanium nitride and silicon complex coatings thereon, is cooled in a lehr.

The resulting coated glass article comprises a glass substrate having adhered thereto sequential coatings of titanium nitride, about 400 ±50 Angstroms thick, and silicon complex, about 100 ±25 Angstroms thick. The coated glass article is blue in reflection from the glass side and magenta from the coated sides. The emissivity is about 0.65 to about 0 75. The shading coefficient is about 0.39 from the glass side. The visible reflectance is about 11% from the glass side, and about 18% from the coated side. The daylight or visible transmittance is about 21%, and the coated glass article is temperable.

The coated glass article in Example 6 exhibits the following CIELAB parameters:

|                      |           |
| -------------------- | --------- |
| Transmitted Color:   | a* = −4   |
|                      | b* = +7   |
| Glass Side Reflected | a* = 0    |
| Color:               | b* = −8   |

What is claimed is:
1. A coated glass article, comprising:
(A) a glass substrate, having a surface;
(B) a coating of titanium nitride deposited on and adhering to the surface of the glass substrate;
(C) a coating of a silicon complex, represented by the general formula $SiC_xO_y$, wherein x is more than 0 but not more than 1, and y is more than 0 but not more than 2, deposited on and adhering to the coating of titanium nitride; and
(D) optionally, a coating of a metal oxide or an oxide of silicon deposited on and adhering to the coating of the silicon complex, said coated glass article having a visible light transmittance less than about 36%, a shading coefficient measured at both the coated and glass sides less than about 0.5, a glass side reflectance less than about 20%, and a coated side reflectance less than about 25%.

2. The coated glass article of claim 1, wherein the glass substrate is selected from the group consisting of clear glass, blue glass, blue-green glass, green glass, bronze glass, and neutral grey glass.

3. The coated glass article of claim 2, wherein the glass substrate is neutral grey glass.

4. The coated glass article of claim 1, wherein the metal oxide is selected from the group consisting of tin oxide, titanium oxide, aluminum oxide, and mixtures thereof.

5. The coated glass article of claim 4, wherein the metal oxide is tin oxide.

6. The coated glass article of claim 1 wherein the titanium nitride coating is about 200 to about 600 Angstroms thick.

7. The coated glass article of claim 6, wherein the titanium nitride coating is about 300 to about 550 Angstroms thick.

8. The coated glass article of claim 1 wherein the silicon complex coating is about 75 to about 300 Angstroms thick.

9. The coated glass article of claim 8, wherein the silicon complex coating is about 75 to about 150 Angstroms thick.

10. The coated glass article of claim 1, wherein the silicon oxide or metal oxide coating is about 100 to about 500 Angstroms thick.

11. The coated glass article of claim 10, wherein the silicon oxide or metal oxide coating is about 150 to about 300 Angstroms thick.

12. The coated glass article of claim 1, wherein the visible light transmittance of the article is from about 15% to about 30%.

13. The coated glass article of claim 1, wherein the reflectance of the article, when viewed from the coated side is less than about 15%.

14. A coated glass article, comprising:
A) a glass substrate, selected from the group consisting of clear glass, blue glass, blue-green glass, green glass, bronze glass, and neutral grey glass, the glass substrate having a surface;
B) a coating of titanium nitride deposited on and adhering to the surface of the glass substrate;
C) a coating of a silicon complex, represented by the general formula $SiC_xO_y$, wherein x is more than 0 but not more than 1 and y is more than 0 but not more than 2, deposited on and adhering to the coating of titanium nitrite; and
D) optionally, a coating of an oxide of silicon or a metal oxide selected from the group consisting of tin oxide, titanium oxide, aluminum oxide, and mixtures thereof overlaying the silicon complex;
wherein the titanium nitride coating is about 200 to about 600 Angstroms thick, the silicon complex coating is about 75 to about 300 Angstroms thick, and the metal oxide or silicon oxide coating is about 100 to about 500 Angstroms thick; and further
wherein the visible light transmittance is less than about 36%, the shading coefficient, measured at either the coated side or the glass side, is less than about 0.50 and the reflectance when viewed from both the glass side and the coated side is less than about 20%.

15. The coated glass article of claim 14, wherein the glass substrate is neutral grey glass.

16. The coated glass article of claim 14, wherein the reflectance of the article, when viewed from the coated side, is less than about 15%.

17. A coated glass article, comprising:
A) a neutral grey glass substrate, having a surface;
B) a coating of titanium nitride deposited on and adhering to the surface of the glass substrate;
C) a coating of a silicon complex, represented by the general formula $SiC_xO_y$, wherein x is more than 0 but not more than 1 and y is more than 0 but not more than 2, deposited on and adhering to the coating of titanium nitride; and
D) optionally, a coating of tin oxide deposited on and adhering to the coating of the silicon complex;
wherein the titanium nitride coating is about 300 to about 550 Angstroms thick, the silicon complex coating is about 75 to about 150 Angstroms thick, and the tin oxide coating is about 150 to about 300 Angstroms thick; and further
wherein the visible light transmittance is about 15% to about 30%. the shading coefficient, measured at either the coated side or the glass side, is less than about 0.50. the reflectance when viewed from the coated side is less than about 15%. and the reflectance when viewed from the glass side is less than about 20%.

18. A glazing for automotive and architectural windows, comprising a coated glass article as defined in claim 1.

19. A glazing for automotive and architectural windows, comprising a coated glass article as defined in claim 14.

20. A glazing for automotive and architectural windows, comprising a coated glass article as defined in claim 17.

* * * * *